(12) United States Patent
Narayanan et al.

(10) Patent No.: US 11,720,995 B2
(45) Date of Patent: Aug. 8, 2023

(54) IMAGE RECTIFICATION

(71) Applicant: Ford Global Technologies, LLC, Dearborn, MI (US)

(72) Inventors: Praveen Narayanan, San Jose, CA (US); Ramchandra Ganesh Karandikar, Palo Alto, CA (US); Nikita Jaipuria, Union City, CA (US); Punarjay Chakravarty, Campbell, CA (US); Ganesh Kumar, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 17/338,900

(22) Filed: Jun. 4, 2021

(65) Prior Publication Data

US 2022/0392014 A1    Dec. 8, 2022

(51) Int. Cl.
*G06K 9/00*    (2022.01)
*G06T 3/00*    (2006.01)
(Continued)

(52) U.S. Cl.
CPC ........... *G06T 3/0018* (2013.01); *B60W 10/06* (2013.01); *B60W 10/08* (2013.01); *B60W 10/18* (2013.01);
(Continued)

(58) Field of Classification Search
CPC ..... G06T 3/0018; G06T 5/006; G06T 7/0002; G06T 2207/20081; G06T 2207/20084;
(Continued)

(56) References Cited

U.S. PATENT DOCUMENTS 10,699,389 B2    6/2020    Van der Auwera et al.
2019/0034497 A1    1/2019    Song et al.
(Continued)

FOREIGN PATENT DOCUMENTS

JP    2019095836 A    6/2019
WO    2020020231 A1    1/2020

OTHER PUBLICATIONS

Liu, Juncheng, Steven Mills, and Brendan McCane. "Variational Autoencoder for 3D Voxel Compression." 2020 35th International Conference on Image and Vision Computing New Zealand (IVCNZ). IEEE, 2020. (Year: 2020).*

(Continued)

*Primary Examiner* — Jonathan S Lee
(74) *Attorney, Agent, or Firm* — Frank A. MacKenzie; Bejin Bieneman PLC

(57) ABSTRACT

A computer, including a processor and a memory, the memory including instructions to be executed by the processor to input a fisheye image to a vector quantized variational autoencoder. The vector quantized variational autoencoder can encode the fisheye image to first latent variables based on an encoder. The vector quantized variational autoencoder can quantize the first latent variables to generate second latent variables based on a dictionary of embeddings. The vector quantized variational autoencoder can decode the second latent variables to a rectified rectilinear image using a decoder and output the rectified rectilinear image.

20 Claims, 7 Drawing Sheets

(51) Int. Cl.
  G06T 5/00 (2006.01)
  G06T 7/00 (2017.01)
  B60W 10/06 (2006.01)
  B60W 10/18 (2012.01)
  B60W 10/20 (2006.01)
  B60W 10/08 (2006.01)
  G05B 13/02 (2006.01)
  B60W 50/06 (2006.01)

(52) U.S. Cl.
  CPC ............ B60W 10/20 (2013.01); B60W 50/06 (2013.01); G05B 13/027 (2013.01); G06T 5/006 (2013.01); G06T 7/0002 (2013.01); B60W 2420/42 (2013.01); G06T 2207/20081 (2013.01); G06T 2207/20084 (2013.01); G06T 2207/30252 (2013.01)

(58) Field of Classification Search
  CPC ........ G06T 2207/30252; B60W 10/06; B60W 10/08; B60W 10/18; B60W 10/20; B60W 50/06; B60W 2420/42; G05B 13/027
  USPC .......................................................... 382/104
  See application file for complete search history.

(56) References Cited

U.S. PATENT DOCUMENTS

2019/0354836 A1  11/2019  Shah et al.
2020/0302667 A1   9/2020  del Val Santos et al.
2020/0404318 A1  12/2020  Matsumoto

OTHER PUBLICATIONS

Konrad, Anna, et al. "FisheyeSuperPoint: Keypoint Detection and Description Network for Fisheye Images." arXiv preprint arXiv: 2103.00191 (2021). (Year: 2021).*

Zhao, Jie, et al. "DQN-based gradual fisheye image rectification." Pattern Recognition Letters 152 (2021): 129-134. (Year: 2021).*

Razavi, A;, et al., "Generating Diverse High-Fidelity Images with VQ-VAE-2," arXiv:1906.00446v1 [cs.LG], Jun. 2, 2019, 15 pages.

van den Oord, A., et al., "Neural Discrete Representation Learning," arXiv:1711.00937v2 [cs.LG], May 30, 2018, 11 pages.

* cited by examiner

IMAGE RECTIFICATION

BACKGROUND

Deep neural networks can perform a variety of computing tasks. For example, neural networks can be trained to transform images. Images transformed by deep neural networks can be used by computing devices to operate systems including vehicles, robots, security, product manufacturing and product tracking. Images can be acquired by sensors included in a system and processed using deep neural networks to transform the images into formats that can be then further processed by computing devices included in the system. For example, transformed images can be input to second deep neural networks to detect objects in the transformed images and operate a system based on the detected objects.

DETAILED DESCRIPTION

Figure 1:
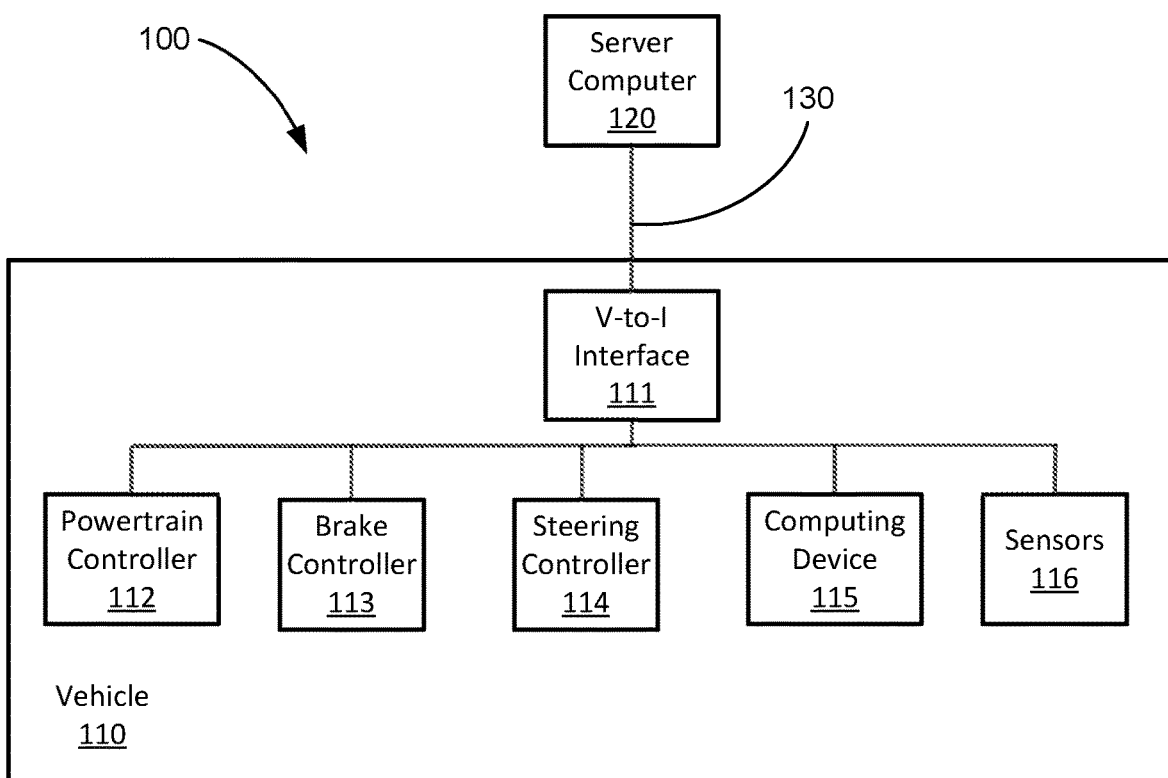
FIG. 1 is a block diagram of an example deep neural network system.

Images acquired be sensors included in systems can be processed by computing devices included in the systems to permit operation of the system. Vehicles, robots, manufacturing systems, package handling systems, and security systems can all acquire and process image data to permit operation of the system. For example, vehicles, robots, manufacturing system, package handling systems, and security systems can acquire image data and input the image data to a deep neural network to detect objects in the image data. Detecting objects in image data includes determining a label that identifies the object and locating the object in the image or in the real-world environment around the system. An object label and location can be input to a computing device included in the system to operate the system. For example, a computing device in a vehicle can determine a vehicle path upon which to operate that avoids contact with an object labeled "vehicle" or "pedestrian". A computing device in a robot can direct an end effector such as a gripper on a robot arm to pick up a detected object. A computing device in a manufacturing system can direct the manufacturing system to assemble a component based on detecting one or more objects. A computing device in a package handling system can direct a detected object to a correct location within the package handline system. A computing device in a security system can grant or deny access based on performing facial identification on a detected object.

Image or video sensors included in a system can include a fisheye lens. A fisheye lens is an ultra wide-angle lens that permits the sensor to acquire image data from a field of view that encompasses up to 180° in both the vertical and horizontal directions. A fisheye lens differs from regular, rectilinear lenses by introducing distortion that maps straight lines into curves. A rectilinear lens has a smaller field of view that avoids distorting straight lines into curves and corresponds to the lenses typically used in cameras. Fisheye lenses have the advantage of acquiring image data from a much wider field of view than rectilinear lenses. A single camera with a fisheye lens can acquire data from a field of view that would require several cameras with rectilinear lenses to cover. A fisheye camera is a camera that includes a fisheye lens and a rectilinear camera is a camera that includes a rectilinear lens.

Most image processing software including deep neural networks included in systems such as vehicles, robots, manufacturing system, package handling systems, or security systems rely on images acquired with rectilinear lenses. Images acquired with a fisheye lens can require rectification prior to being processed with image processing software including deep neural networks. Rectification can transform fisheye image data to make the image data appear as if it were acquired with a rectilinear lens. Rectifying a fisheye image can transform curved lines in the fisheye image into straight lines, thereby making the rectified image suitable for processing with image processing software including deep neural networks. Rectifying fisheye images maintains the advantage of having a single image sensor with an ultra-wide field of view while permitting the use of image processing software trained using rectilinear images.

Fisheye image rectification can be performed using an analytical lens model. Image rectification is a mathematical transformation that corrects geometric distortion in an image. An analytical model uses data regarding a fisheye lens and camera system to determine transformations that undistort or rectify a fisheye image. The analytical model can require a distortion model for the lens and camera that includes characterization of environmental conditions such as lighting and distances. Typically, the distortion model requires accurate calibration using image data similar to the scene included in the image to be rectified, where the similarity includes lighting and distances from the camera to portions of the scene. Determining a distortion model for a fisheye lens and camera system can require a trial-and-error process that is prone to error and consumes a large amount of computing resources to complete.

Techniques discussed herein improve fisheye image rectification by use of a vector quantized variational autoencoder (VQ-VAE) to rectify fisheye images. A VQ-VAE is a neural network that can be trained to rectify fisheye images by training the VQ-VAE with a plurality of example images. A VQ-VAE can be trained in supervised mode, where examples of the same scene acquired with both a fisheye lens and a rectilinear lens are available, and unsupervised mode, where both example fisheye lens images and example rectilinear lens images are available, but not necessarily paired fisheye and rectilinear images of the same scene. Image rectification using a VQ-VAE improves fisheye image rectification by avoiding analytical model calibration for various operating environments and lenses by learning to rectify fisheye images from sample data. Training a VQ-VAE to rectify fisheye images can be less error prone and consume fewer computing resources than determining a distortion model by trial-and-error.

Vehicle guidance as described herein is a non-limiting example of using a DNN with rectified fisheye image data. For example, a computing device in a vehicle can be programmed to acquire a fisheye image data regarding the external environment of a vehicle with a fisheye lens camera, rectify the fisheye image and detect objects in the rectified image using a DNN. A DNN can be trained to label and locate objects in the rectified image data. A computing device included in the vehicle can use the label and location of the detected objects to determine a vehicle path upon which to operate a vehicle in an autonomous or semi-autonomous mode. A vehicle can operate on a roadway based on a vehicle path by determining commands to direct one or more of the vehicle's powertrain, braking, and steering components to operate the vehicle to travel along the path.

Disclosed herein is a method including inputting a fisheye image to a vector quantized variational autoencoder, encoding the fisheye image to first latent variables using an encoder, quantizing the first latent variables to generate second latent variables based on an embedded dictionary, decoding the second latent variables to a rectified rectilinear image using a decoder and outputting the rectified rectilinear image. A vehicle can be operated based on the rectified rectilinear image output from the vector quantized variational autoencoder. The vehicle can be operated by controlling vehicle powertrain, vehicle brakes and vehicle steering. The vector quantized variational autoencoder can be trained to transform the fisheye image to the rectified rectilinear image in a supervised mode using a training dataset that includes paired fisheye images and rectilinear images. The paired fisheye images and rectilinear images can be generated using an analytical model based on a distortion model for a camera that acquired the fisheye images. The paired fisheye images and rectilinear images can be generated using a fisheye camera and a rectilinear camera.

The fisheye image can be input to a dual vector quantized variational autoencoder which outputs the rectified rectilinear image. The dual vector quantized variational autoencoder can be trained in unsupervised mode using unpaired fisheye images and rectilinear images. The dual vector quantized variational autoencoder can be trained using cycle consistency, wherein the dual vector quantized variational autoencoder includes a shared latent space. The vector quantized variational autoencoder can be trained using a discriminator. The discriminator can determine a real image from a fake image. The vector quantized variational autoencoder can be trained on a second computer and downloaded to a computer in the vehicle. The dual vector quantized variational autoencoder can be trained on a second computer and downloaded to a computer in the vehicle. Operating the vehicle can include determining a vehicle path based on the rectified rectilinear image.

Further disclosed is a computer readable medium, storing program instructions for executing some or all of the above method steps. Further disclosed is a computer programmed for executing some or all of the above method steps, including a computer apparatus, programmed to input a fisheye image to a vector quantized variational autoencoder, encode the fisheye image to first latent variables using an encoder, quantize the first latent variables to generate second latent variables based on an embedded dictionary, decode the second latent variables to a rectified rectilinear image using a decoder and output the rectified rectilinear image. A vehicle can be operated based on the rectified rectilinear image output from the vector quantized variational autoencoder. The vehicle can be operated by controlling vehicle powertrain, vehicle brakes and vehicle steering. The vector quantized variational autoencoder can be trained to transform the fisheye image to the rectified rectilinear image in a supervised mode using a training dataset that includes paired fisheye images and rectilinear images. The paired fisheye images and rectilinear images can be generated using an analytical model based on a distortion model for a camera that acquired the fisheye images. The paired fisheye images and rectilinear images can be generated using a fisheye camera and a rectilinear camera.

The computer apparatus can be further programmed to input the fisheye image to a dual vector quantized variational autoencoder which outputs the rectified rectilinear image. The dual vector quantized variational autoencoder can be trained in unsupervised mode using unpaired fisheye images and rectilinear images. The dual vector quantized variational autoencoder can be trained using cycle consistency, wherein the dual vector quantized variational autoencoder includes a shared latent space. The vector quantized variational autoencoder can be trained using a discriminator. The discriminator can determine a real image from a fake image. The vector quantized variational autoencoder can be trained on a second computer and downloaded to a computer in the vehicle. The dual vector quantized variational autoencoder can be trained on a second computer and downloaded to a computer in the vehicle. Operating the vehicle can include determining a vehicle path based on the rectified rectilinear image.

FIG. 1 is a diagram of an object detection system 100 that can be implemented with a machine such as a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Computing devices discussed herein such as the computing device 115 and controllers 112, 113, 114 include a processors and memories such as are known. The memory includes one or more forms of computer readable media, and stores instructions executable by the processor for performing various operations, including as disclosed herein. For example, a computing device or controller 112, 113, 114, 114 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. In another example, computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
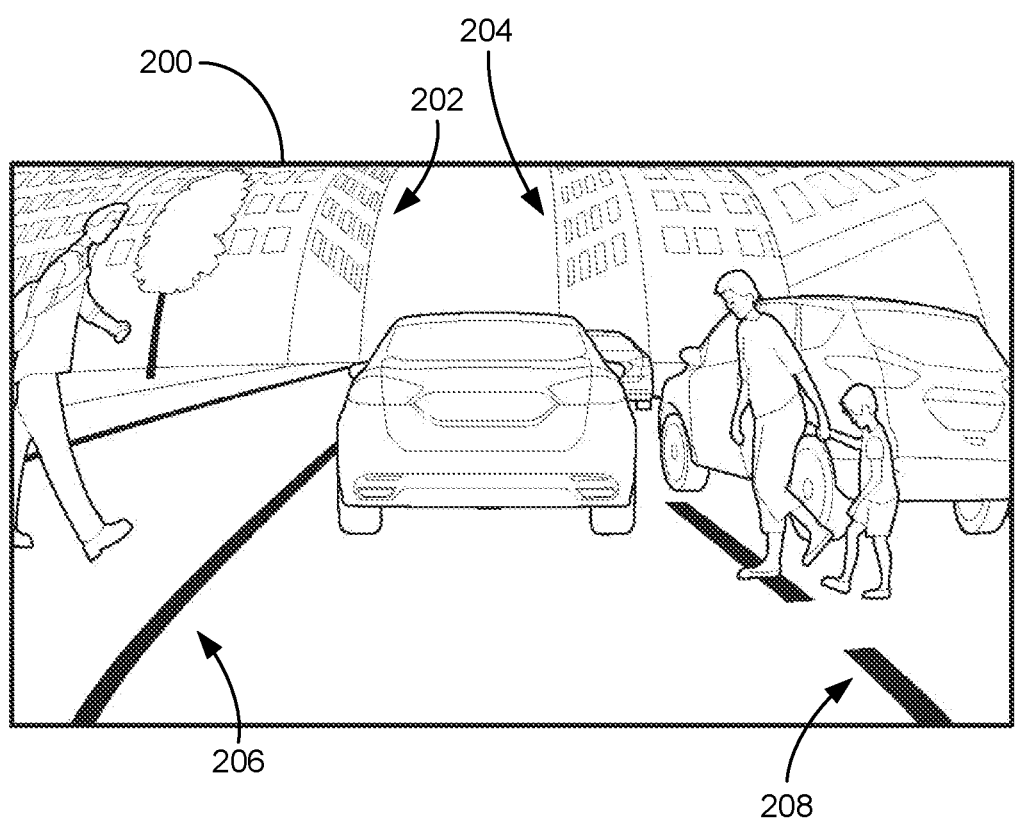
FIG. 2 is a diagram of an example fisheye image.

FIG. 2 is a diagram of an example fisheye image 200. As can be seen in fisheye image 200, portions of the fisheye image 200, that typically appear as straight lines in the real world, such as edges of buildings 202, 204, and roadway lane markings 206, 208 appear to be curved in fisheye image 200. Curvature of straight lines in fisheye image 200 is a function of fisheye lens distortion and is a result of the increased field of view provided by the fisheye lens that was used to acquire fisheye image 200.

Figure 3:
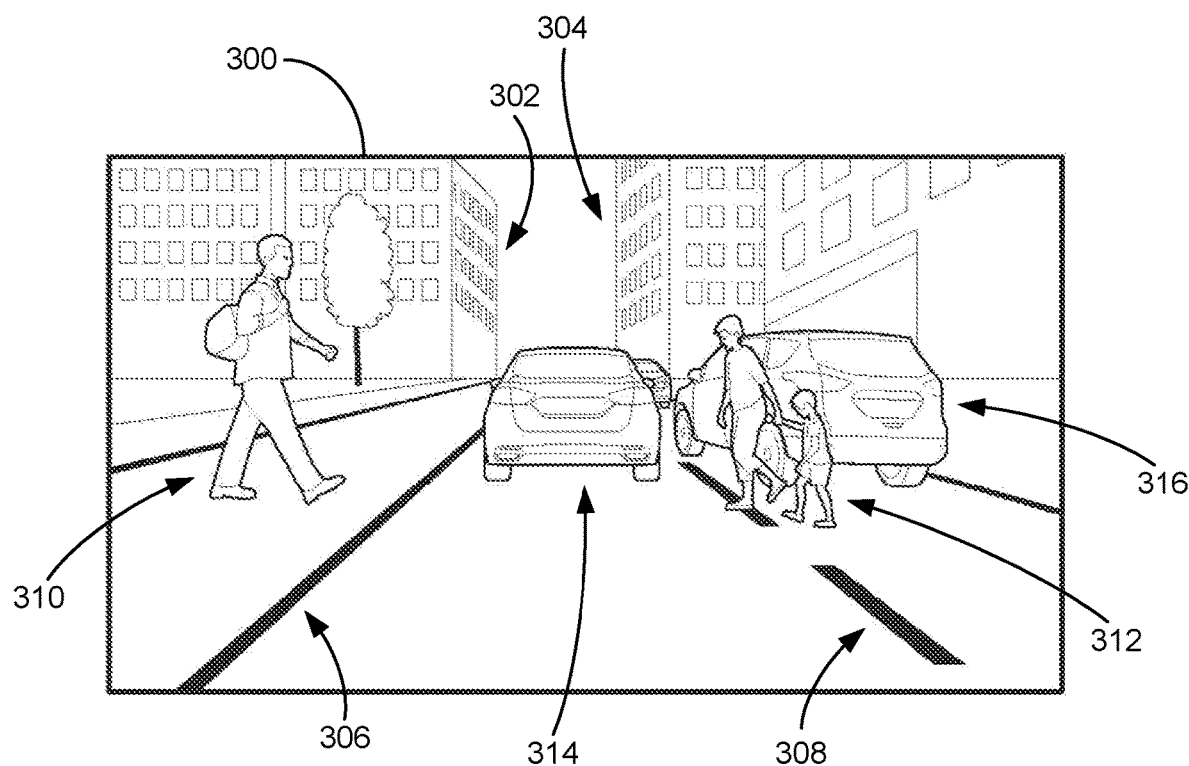
FIG. 3 is a diagram of an example rectilinear image.

FIG. 3 is a diagram of an example rectilinear image 300. Rectilinear image 300 can be acquired by a camera using a lens that generates rectilinear images 300 or generated by processing a fisheye image 200. Fisheye images 200 can be processed with a trained VQ-VAE as discussed herein in relation to FIGS. 4 and 5 or processed using an analytical model as will be discussed below in relation to FIG. 4. In rectilinear image 300, the edges of the buildings 302, 304, and roadway lane markings 306, 308 appear to be straight lines. A rectilinear image 300 is now in a condition to be input to image processing software included in a system 100, such a vehicle 110, for example. The image processing software can include a DNN, for example, that can detect objects such as pedestrians 310, 312 or vehicles 314, 316 in the rectilinear image 300.

Figure 4:
FIG. 4 is a diagram of an example vector quantized variational autoencoder (VQ-VAE).

FIG. 4 is a diagram of a VQ-VAE 400. A VQ-VAE 400 is a type of neural network that is a software program that can execute on a computing device 115 or a server computer 120. For example, a VQ-VAE 400 can be trained on a server computer 120 and then downloaded to a computing device 115 included in a vehicle 110 to input a fisheye image (IN) 402 acquired by a sensor 116 that can be a video camera that includes a fisheye lens and output a rectified image (OUT) 414. The rectified image 414 can be output to image processing software including a DNN executing on computing device 115. The output from the DNN can be used to operate the vehicle 110, for example. Examples of image processing software tasks that can execute on computing device 115 using a rectified image 414 include valet parking, where computing device 115 can locate and direct vehicle 110 travel to and from a parking spot autonomously, and automatic selectable drive mode (AutoSDM), where computing device 115 can classify road conditions (dry, wet, snowy, etc.) for use in setting limits on permitted lateral and longitudinal accelerations generated by controlling powertrain, brakes and steering. Both valet parking and AutoSDM can use DNNs to input image data and output predictions regarding labels, locations and conditions of objects in an environment around a vehicle 110.

VQ-VAE 400 includes an encoder (ENC) 404, first latent variables (LV1) 406, a quantizer (QNT) 408, second latent variables (LV2) 410, a decoder (DEC) 412. An encoder 404 includes a plurality of convolutional layer that convolve an input fisheye image 402 with convolution kernels that determine where each pixel in the input fisheye image 402 should be relocated to rectify a fisheye image 402 to generate a rectified image 414. The data regarding pixel relocation is encoded in latent variables 406 by decreasing the x, y resolution of input fisheye image 402 from 256×256 to 64×64 pixels while increasing the bit depth of each pixel from one eight-bit channel for grayscale imaging to 256 channels corresponding to a continuous, i.e., real number space, for example. This example assumes that the 256 channels correspond to one-dimensional (1D) quantization. Other x, y resolutions and number of channels are possible.

The 64×64×256 latent variables 406 is input to quantizer 408. Quantizer 408 reduces each 256-channel value in latent variables 406 into a discrete space of k values, referred to in this context as a one-hot-vector, where k can be any integer. The k one-hot-vectors are determined at training time by analyzing the values included in each 256-channel pixel to determine how many different states are represented by the 256-channel pixels. Quantization is a technique for dividing a large state space having a large number of values into smaller set of portions that can each be represented by one of a smaller number of values. For example, the 256-channel space can be divided into a series of portions, starting from 0 to a first number $s_1$, then a second portion starting at number $s_1$ and going to a second number $s_2$ and so forth until the 256-channel space is divided up according to a sequence of k numbers $s_1, \ldots, s_i, \ldots s_k$ into k portions. All of the values in the 256-channel space between a starting value $s_i$ and an ending value $s_{i+1}$ are mapped into the value i. Quantizer 408 inputs first latent variables 406 having dimension 64×64×256 and outputs second latent variables 410 having dimension 64×64×k. Quantizer 408 maps input latent variables 406 into a set of one-hot-vectors using an embedded dictionary. An embedded dictionary is an ordered list of input latent variables that performs the mapping of the 256-channel space into a smaller set of values as discussed above. The dictionary is referred to as an embedded dictionary because it is determined in the VQ-VAE 400 as opposed to being constructed by a separate process outside the VQ-VAE 400.

The value of k and the values for numbers $s_1, \ldots, s_k$ are determined at training time for VQ-VAE 400. By analyzing output rectified images 414 with respect to input fisheye images 402, pixel relocation data for each pixel in each pair of input fisheye images 402 and output rectified images 414 can be determined. Smoothing and averaging the pixel relocation data can determine the minimum number of pixel relocation values that can yield the output rectified images 414 given the 256-channel values in first latent variables corresponding to the input fisheye image 402. The minimum number of pixel relocation values is the number k and the values $s_1, \ldots, s_k$ can be determined by comparing teach pixel relocation value to the 256-channel values for each pair of fisheye images 402 and rectified images 414 in the training dataset. The second latent variables 410 are passed to decoder 412, which includes a plurality of convolutional layers that expand the 64×64×k second latent variables 410 into a 256×256 eight-bit grayscale rectified image 414.

VQ-VAE 400 can be trained in a supervised fashion, where for each fisheye image 402 in the training dataset a corresponding ground truth rectilinear image of the same scene is available. The ground truth rectilinear image can be obtained by performing image rectification using an analytical model, or by acquiring a rectilinear image using a second camera having a rectilinear lens viewing the same scene at the same time as the fisheye lens camera acquires the fisheye image 402. VQ-VAE 400 can be trained by inputting a fisheye image 402 to VQ-VAE 400 a plurality of times, each time comparing the ground truth rectilinear image to the output rectified image 414. Comparison can be performed by pixel-wise subtraction of the ground truth rectilinear image with the output rectified image 414 to determine a summed squared difference between the two images. The summed squared difference is input to a loss function that is input to the encoder 404 and decoder 412 where it is backpropagated through the convolutional layers. Backpropagation is a technique for passing the loss function through the convolutional layers from back to front where it is used to select weights used to program the convolutional kernels of the convolutional layers. Weights are selected that minimize the loss function, i.e., weights that produce output rectified images 414 that most closely resemble the ground truth.

VQ-VAE 400 can be configured to input fisheye images 402 and output rectified images 414 or input rectilinear images and output fisheye images 402 by attaching two bits to each pixel of images input to the VQ-VAE 400. When the two bits are equal to [1,0], the image is processed as a fisheye image 402 to output a rectified image 414. When the two bits are equal to [0,1], the input image is processed as a rectilinear image to output a fisheye image 402. Training the VQ-VAE 400 to accomplish this processing can use the same training dataset as was used to train the VQ-VAE 400 to process fisheye images 402, with the two bits prepended to each pixel of each input image by switching the input images and the ground truth images. To train the VQ-VAE 400 to process rectilinear images and output fisheye images 402 the rectilinear images from the training dataset are used as input and the corresponding fisheye images 402 from the training dataset are used as ground truth.

Figure 5:
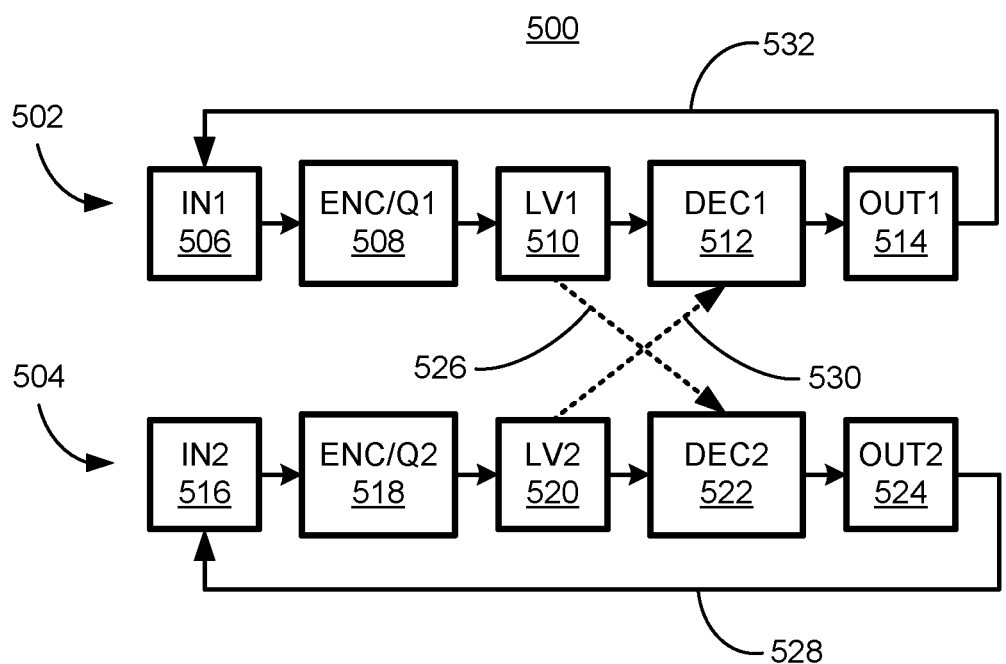
FIG. 5 is a diagram of an example dual VQ-VAE arranged for training by cycle consistency.

FIG. 5 is a diagram of a dual vector quantized variational autoencoder (dual VQ-VAE) 500 configured for unsupervised training. Unsupervised training is training performed with a training dataset that does not include pairs of corresponding fisheye images and rectilinear images. In unsupervised training, the training dataset includes both fisheye images and rectilinear images, but not matched pairs. The dual VQ-VAE 500 includes a fisheye-to-fisheye image VQ-VAE 502 and a rectilinear-to-rectilinear VQ-VAE 504. Fisheye-to-fisheye image VQ-VAE 502 is trained to input a fisheye image (IN1) 506 to an encoder/quantifier (ENC/Q1) 508 that encodes and quantifies the input fisheye image 506 in the same fashion as the encoder 404 and quantizer 408 from VQ-VAE 400 from FIG. 4, above. Encoder/quantifier 508 outputs quantified latent variables (LV1) 510 which are input to decoder (DEC1) 512. Decoder 512 reconstructs the quantified latent variables 510 to output a reconstructed fisheye image 514. Fisheye-to-fisheye image VQ-VAE 502 is trained to reconstruct fisheye images 514 from input fisheye images 506 using a training dataset of fisheye images 506 as both input and corresponding ground truth.

Rectilinear-to-rectilinear image VQ-VAE 504 is trained to input a rectilinear image (IN2) 516 to encoder/quantifier (ENC/Q2) 518 to form quantified latent variables (LV2) 520 in the same fashion as the encoder 404 and quantizer 408 from VQ-VAE 400 from FIG. 4, above. The encoder/quantifier 518 outputs quantified latent variables 520 to decoder (DEC2) 522 which decodes the quantified latent variables 520 to output a rectified image (OUT2) 524. Rectilinear-to-rectilinear image VQ-VAQ 504 is trained to reconstruct rectified images 524 using a training dataset of rectilinear images as both input and corresponding ground truth.

Dual VQ-VAE 500 can be trained to input fisheye images 506 and output rectified images 524 and input rectilinear images 516 and output fisheye images 514 using shared latent variables 510, 520 and cycle consistency. Shared latent variables 510, 520 comprise a shared latent space that permits dual VQ-VAE 500 to exchange 526, 530 latent variables. Latent variables 510, 520 are shared by using a single embedded dictionary when training both fisheye-to-fisheye image VQ-VAE 502 and a rectilinear-to-rectilinear VQ-VAE 504. As discussed in relation to FIG. 4, above, an embedded dictionary is determined by compiling a list of all the latent variables corresponding to encoded input images during training. The embedded dictionary is then processed to determine groups of latent variable representations, or learned dictionary entries that can be represented by a single value. Cluster analysis is an example technique for determining groups of latent variable embeddings that can be replaced by a single value by the quantifier portion of encoder/quantifier. The shared latent variables 510, 520 are generated using a single embedded dictionary and a single set of quantifier values.

Using shared latent variables 510, 520 permits latent variables 510, 520 to be exchanged 526, 530 between fisheye-to-fisheye image VQ-VAE 502 and a rectilinear-to-rectilinear VQ-VAE 504. Exchanging 526 latent variables 520 generated by encoder/quantifier 518 in rectilinear-to-rectilinear VQ-VAE 504 permits fisheye-to-fisheye image VQ-VAE 502 to decode 512 latent variables 520 to produce an output fisheye image 514 in response to an input rectilinear image 516. In likewise fashion, exchanging 526 latent variables 510 generated by encoder/quantifier 508 in fisheye-to-fisheye VQ-VAE 502 permits rectilinear-to-rectilinear VQ-VAE 504 to output a rectified image 524 in response to an input fisheye image 506.

An advantage of a dual VQ-VAE 500 is that it can be trained in an unsupervised fashion, meaning that paired fisheye and rectilinear images are not required for training. The dual VQ-VAE 500 is trained using cycle consistency. Cycle consistency is when, for example, a fisheye image 506 is input to fisheye-to-fisheye VQ-VAE 502. The latent variables 510 are exchanged 526 with rectilinear-to-rectilinear VQ-VAE 504 and output as a rectified image 524. The output rectified image 524 is passed back 528 to be input as a rectilinear image 516, where it is processed by rectilinear-to rectified VQ-VAE 504 encoder/quantifier 518 and exchanged 530 to be decoded by decoder 512 and output as a fisheye image 514. The output fisheye image 514 can be compared with the input fisheye image 514 to determine a loss function that can be used to train both the fisheye-to-fisheye VQ-VAE 502 and the rectilinear-to-rectilinear VQ-VAE 504. A comparison that can be used to generate the loss function is a squared sum of differences, for example. The fisheye-to-fisheye VQ-VAE 502 and the rectilinear-to-rectilinear VQ-VAE 504 can be trained without exchanging 526, 530 first, and then trained using latent variable 510, 520 exchange 526, 530 to determine cycle consistency. In this fashion, dual VQ-VAE 500 can be trained to generate rectified image 524 output from fisheye image 506 input and fisheye image 514 output from rectilinear image input 516.

Figure 6:
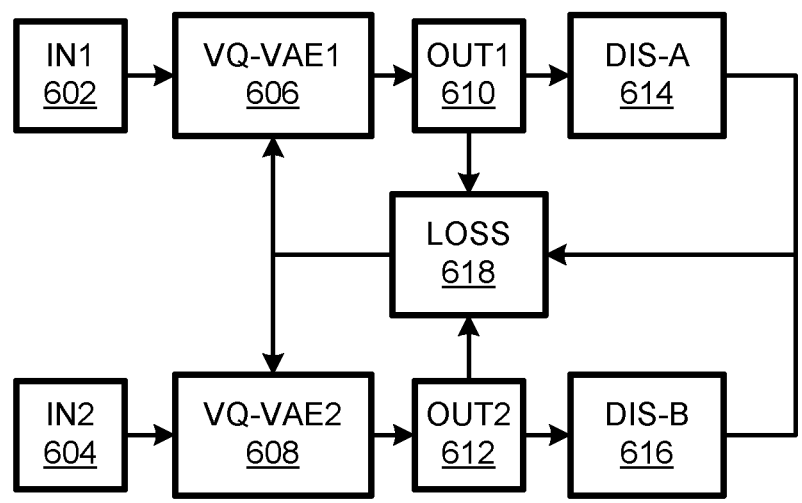
FIG. 6 is a diagram of an example dual VQ-VAE generative adversarial network.

FIG. 6 is a diagram of a VQ-VAE generative adversarial network (GAN) 600, which includes a dual VQ-VAE 500 as discussed in relation to FIG. 5, above. VQ-VAE1 606 includes encoder/quantifier 508, latent variables 510, and decoder 512 from fisheye-to-fisheye VQ-VAE 502 included in dual VQ-VAE 500 in FIG. 5. VQ-VAE2 608 includes encoder/quantifier 518, latent variables 520, and decoder 522 from rectilinear-to-rectilinear VQ-VAE 504 included in dual VQ-VAE 500 in FIG. 5. VQ-VAE-GAN 600 inputs both fisheye images (IN1) 602 and rectilinear images (IN2) and includes fisheye-to-fisheye VQ-VAE 606 and the rectilinear-to-rectilinear VQ-VAE 608 as discussed above in relation to FIG. 5. Fisheye-to-fisheye VQ-VAE 606 and the rectilinear-to-rectilinear VQ-VAE 608 output reconstructed fisheye images (OUT1) 610 and transformed rectilinear images (OUT2) 612, respectively. During training, two discriminators, discriminator A (DIS-A) 614 and discriminator B (DIS-B) 616 receive output reconstructed fisheye images 610 and transformed rectilinear images 612, respectively.

Discriminator A 614 and discriminator B 616 are neural networks that include a plurality of convolutional layers. During training, discriminator A 614 and discriminators B 616 are trained to distinguish "real" fisheye and rectilinear images from "fake" fisheye and rectilinear images, respectively. A "real" fisheye or rectilinear image is an image that has been passed directly through fisheye-to-fisheye VQ-VAE 606 and the rectilinear-to-rectilinear VQ-VAE 608 without exchanging latent variables. A "fake" fisheye or rectilinear image is an image that has been reconstructed after a cycle consistency exchange 526, 530 and passing through fisheye-to-fisheye VQ-VAE 606 or rectilinear-to-rectilinear VQ-VAE 608 a second time. For example, a rectilinear image incorrectly reconstructed into a fisheye image by VQ-VAE-GAN 600 would be determined by discriminator B 616 as a "fake" fisheye image. Discriminator A 614 and discriminator B 616 output a value from 0 to 1, where 0 corresponds to a "fake" image and 1 corresponds to a "real" image. Training VQ-VAE-GAN 600 includes training fisheye-to-fisheye VQ-VAE 606 and the rectilinear-to-rectilinear VQ-VAE 608 in cycle-consistency mode as discussed above in relation to FIG. 5 to output reconstructed rectilinear images 612 based on input fisheye images 602. Training is complete when discriminator B 616 determines an output rectilinear image 612 reconstructed based on an input fisheye image 602 to be a "real" rectilinear image.

VQ-VAE-GAN 600 is trained by determining a loss function (LOSS) 618 based on output fisheye image 610, output rectilinear image 612, output from discriminator A 614, output from discriminator B 616 and ground truth for both input fisheye image 602 and input rectilinear image 604. Loss function 618 $L_G$ is a function of a fisheye-to-fisheye VQ-VAE 606 loss function $L_{VQVAE_A}$, a rectilinear-to-rectilinear loss function $L_{VQVAE_B}$, a first cycle consistency loss function $L_{CC_A}$, a second cycle consistency loss function $L_{CC_B}$, a discriminator A 614 loss function $L_{GAN_A}$, and a discriminator B 616 loss function $L_{GAN_B}$:

$$L_G = L_{VQVAE_A} + L_{VQVAE_B} + L_{CC_A} + L_{CC_B} + L_{GAN_A} + L_{GAN_B} \quad (1)$$

Where $$L_{VQVAE_{A,B}} = \log p(x|z_q(x)) + \|sg[z_e(x)] - e\|_2^2 + \beta\|z_e(x) - sg[e]\|_2^2 \quad (2)$$

The first term, $\log p(x|z_q(x))$ is reconstruction loss, which optimizes the encoder 508, 518 and decoder 512, 522 portions of VQ-VAE-GAN 600 based on the inputs x and outputs $z_q(x)$ to and from fisheye-to-fisheye VQ-VAE 606 and the rectilinear-to-rectilinear VQ-VAE 608. $\|sg[z_e(x)] - e\|_2^2$ is codebook loss, where $z_e(x)$ are the latent variables 510, 520 output from encoders 508, 518 compared to the embedded dictionary e and sg is the stop gradient operator which is constrained to be the identity operator at forward computation time and has zero partial derivatives. $\beta\|z_e(x) - sg[e]\|_2^2$ is commitment loss and includes a constant $\beta$ to prevent the embedded dictionary from growing arbitrarily if the embeddings e do not grow as fast as the encoder parameters.

First cycle consistency loss function $L_{CC_A}$, second cycle consistency loss function $L_{CC_B}$, discriminator A 614 loss function $L_{GAN_A}$, and discriminator B 616 loss function $L_{GAN_B}$ are defined by:

$$L_{CC_A} = \lambda_{CC_A} E_{x_A}(Dec_A(Enc_B(Dec_B(Enc_A(x_A)))) - x_A)^2 \quad (3)$$

$$L_{CC_B} = \lambda_{CC_B} E_{x_B}(Dec_B(Enc_A(Dec_A(Enc_B(x_A)))) - x_B)^2 \quad (4)$$

$$L_{GAN_A} = \lambda_{GAN_A} E_{x_B}(Dec_A(Enc_B(x_B)) - 1)^2 \quad (5)$$

$$L_{GAN_B} = \lambda_{GAN_B} E_{x_A}(Dec_B(Enc_A(x_A)) - 1)^2 \quad (6)$$

Where $\lambda_{CC_A}$, $\lambda_{CC_B}$, $\lambda_{GAN_A}$, and $\lambda_{GAN_B}$ are parameters that control the weights of the respective equations, $E_{x_A}$ and $E_{x_B}$ are the embedded dictionary codes and $Dec_A$, $Dec_B$, $Enc_A$, and $Enc_B$ are decodings and encodings of inputs $x_A$ and $x_B$.

Loss function 618 are returned to fisheye-to-fisheye VQ-VAE 606 and the rectilinear-to-rectilinear VQ-VAE 608 at training time to select weights for convolutional layers included in encoders 508, 518 and decoders 512, 522. Weights are selected that minimize loss functions 618. At the same time, loss functions 618 are returned to embedded dictionaries included encoders 508, 518 to select optimal dictionary entries based on minimizing loss functions 618. At the same time as loss functions 618 are determined for training encoders 508, 518 and decoders 512, 522, discriminator loss functions $L_{D_A}$ and $L_{D_B}$ are determined to train discriminators A and B 614, 616 to distinguish "real" from "fake" images according to equations:

$$L_{D_A} = E_{x_A}(D_A(x_A) - 1)^2 + E_{x_B}(D_A(Dec_A(Enc_B(x_B))) - 0)^2 \quad (7)$$

$$L_{D_B} = E_{x_B}(D_B(x_B) - 1)^2 + E_{x_A}(D_B(Dec_B(Enc_A(x_A))) - 0)^2 \quad (8)$$

Where $E_{x_A}(D_A(x_A) - 1)^2$ is the loss function corresponding to "real" fisheye images and $E_{x_B}(D_B(x_B) - 1)^2$ is the loss function corresponding to "real" rectilinear images. $E_{x_B}(D_A(Dec_A(Enc_B(x_B))) - 0)^2$ is the loss function corresponding to "fake" fisheye images, and $E_{x_A}(D_B(Dec_B(Enc_A(x_A))) - 0)^2$ is the loss function corresponding to "fake" rectilinear images. The discriminator loss functions are input to discriminator A 614 and discriminator B 616 in response to fisheye image 602 and rectilinear image 604 inputs $x_A$ and $x_B$ respectively. $D_A$ and $D_B$ correspond to outputs from discriminator A 614 and discriminator B 616, respectively. The discriminator loss functions are returned to discriminator A 614 and discriminator B 616 to select weights for the convolutional layers included in discriminator A 614 and discriminator B 616 that minimize the discriminator loss functions.

VQ-VAE-GAN 600 improves generation of rectified rectilinear images 612 from fisheye images 602 over other types of neural networks, including variational autoencoders (VAEs) without vector quantization. A VQ-VAE-GAN 600 can produce sharper images with higher visual quality, meaning that the output rectified image looks more realistic to an observer than a rectified image generated by a VAEs without vector quantization. A VQ-VAE-GAN 600 is also easier to train than a VAE without vector quantization. For a given level of compression, measured by the size of the latent variables 410, the images output by a VQ-VAE-GAN 600 are sharper and include much more perceptual realism.

Perceptual realism includes image details that make an image appear as if it were a real image acquired by a real camera viewing a real-world scene.

VQ-VAE-GAN 600 improves generation of rectified rectilinear images 612 from fisheye images 602 over other types of neural networks, including GANs without vector quantization. GANs can produce realistic images but can be difficult to train. GANs can typically exhibit mode collapse, where the output of the GAN is limited to a small set of outputs. GANs are also subject to training instability, where the outputs fail to converge on a solution despite minimizing the loss function. GANs typically do not include a meaningful latent space, meaning that the latent variables do not relate to the inputs and outputs in a helpful fashion. For example, the latent variables cannot be compressed for use in further processing, whereas the embedded dictionary provided by the latent variables in a VQ-VAE-GAN 600 are a useful, compact representation of the input data. GANs typically are not likelihood-based. Advantageously, likelihood-based models such as a VQ-VAE-GAN 600 offer the ability to assess the quality of the samples produced in terms of their likelihood which can permit out-of-distribution or outlier detection. Likelihood can be determined by examining a distance measure between latent variables produced in response to a particular input and the space defined by the embedded dictionary.

Figure 7:
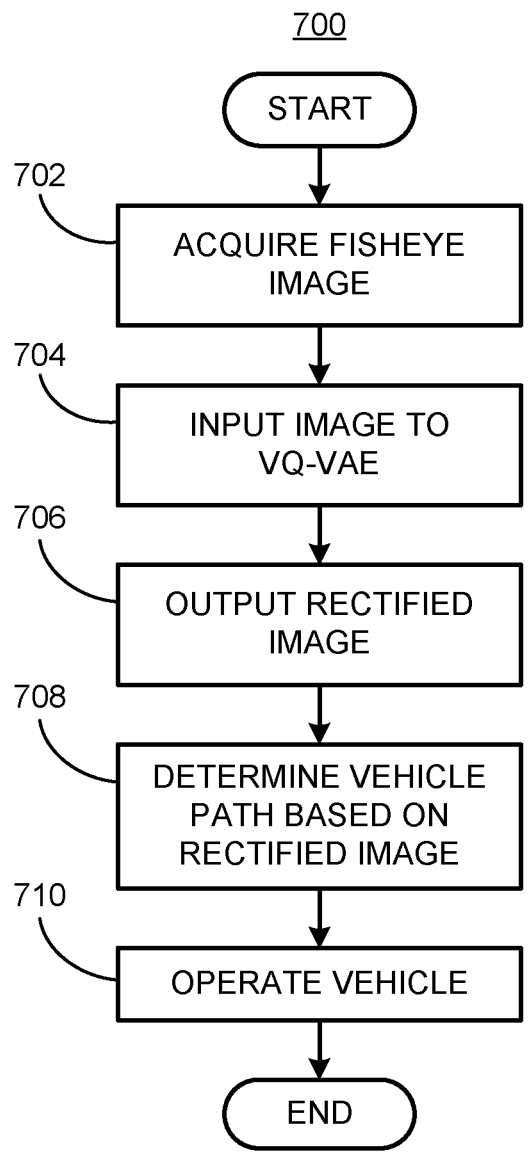
FIG. 7 is a flowchart diagram of an example process to operate a vehicle using a rectified image.

FIG. 7 is a diagram described in relation to FIGS. 1-5, of a process 700 for operating a system based on rectified fisheye images. Process 700 can be implemented by a processor of computing device 115 or server computer 120, taking as input information from sensors, and executing commands, and outputting object information, for example. Process 700 includes multiple blocks that can be executed in the illustrated order. Process 700 could alternatively or additionally include fewer blocks or can include the blocks executed in different orders. Process 700 can be implemented on a computing device 115 included in a vehicle 110, for example.

Process 700 begins at block 702, where a computing device 115 in a vehicle 110 acquires a fisheye image 200, 402, 506, 602. Fisheye image 200, 402, 506, 602 can be acquired by a sensor 116 included in a vehicle 110. Sensor 116 can be a video camera that includes a fisheye lens, for example. Fisheye image 200, 402, 506, 602 can be a single frame from a video sequence acquired by computing device 115.

At block 704 fisheye image 200, 402, 506, 602 is input to a VQ-VAE 400, a dual VQ-VAE 500 or a VQ-VAE-GAN 600. VQ-VAE 400, dual VQ-VAE 500 or VQ-VAE-GAN 600 can all rectify a fisheye image 200, 402, 506, 602 and output a corresponding rectilinear image 300, 414, 524, 612. Differences between VQ-VAE 400, dual VQ-VAE 500 or VQ-VAE-GAN 600 are mainly in training techniques, i.e., supervised vs, unsupervised training or training including a GAN vs. training without a GAN. Although the data paths through VQ-VAE 400, dual VQ-VAE 500 or VQ-VAE-GAN 600 may differ, all input fisheye images 200, 402, 506, 602 are encoded, vector quantified, decoded, and output as a corresponding rectilinear image 300, 414, 524, 612.

At block 706, VQ-VAE 400, dual VQ-VAE 500 or VQ-VAE-GAN 600 output a rectilinear image 300, 414, 524, 612 corresponding to input fisheye image 200, 402, 506, 602 to computing device 115. Although output rectilinear images 300, 414, 524, 612 from VQ-VAE 400, dual VQ-VAE 500 or VQ-VAE-GAN 600 might not be identical due to differences in training datasets and training techniques, the output rectilinear images 300, 414, 524, 612 all include all of the same objects in similar positions and all output rectilinear images have transformed curved lines from fisheye images 200, 402, 506, 602 into straight lines, for example.

At block 708 image processing software included in computing device 115 can input the output rectilinear image 300, 414, 524, 612. Image processing software included in computing device 115 can be a deep neural network, for example. A deep neural network can be trained to input a rectilinear image 300, 414, 524, 612 and output a label and location for one or more objects in the input rectilinear image 300, 414, 524, 612. For example, a deep neural network can label and locate objects including pedestrians, vehicles, and roadway lane markings.

At block 710 computing device 115 can use the output object labels and locations to operate a vehicle 110. Computing device 115 can determine a vehicle path for operating vehicle 110 that avoids pedestrians and vehicles while remaining within roadway lane markings, for example. Computing device 115 can direct vehicle 110 to operate along the determined vehicle path by controlling vehicle powertrain, vehicle brakes, and vehicle steering via controllers 112, 113, 114. Following block 710 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, *Julia*, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
   a processor; and
   a memory, the memory including instructions executable by the processor to:
   input a fisheye image to a vector quantized variational autoencoder;
   encode the fisheye image to first latent variables using an encoder;
   quantize the first latent variables to generate second latent variables based on an embedded dictionary;
   decode the second latent variables to a rectified rectilinear image using a decoder; and
   output the rectified rectilinear image.

2. The computer of claim 1, the instructions including further instructions to operate a vehicle based on the rectified rectilinear image output from the vector quantized variational autoencoder.

3. The computer of claim 2, the instructions including further instructions to operate the vehicle by controlling vehicle powertrain, vehicle brakes and vehicle steering.

4. The computer of claim 1, wherein the vector quantized variational autoencoder is trained to transform the fisheye image to the rectified rectilinear image in a supervised mode using a training dataset that includes paired fisheye images and rectilinear images.

5. The computer of claim 4, the instructions including further instructions to generate the paired fisheye images and rectilinear images using an analytical model based on a distortion model for a camera that acquired the fisheye images.

6. The computer of claim 4, the instruction including further instructions to generate the paired fisheye images and rectilinear images using a fisheye camera and a rectilinear camera.

7. The computer of claim 1, wherein the fisheye image is input to a dual vector quantized variational autoencoder which outputs the rectified rectilinear image.

8. The computer of claim 7, the instructions including further instructions to train the dual vector quantized variational autoencoder in unsupervised mode using unpaired fisheye images and rectilinear images.

9. The computer of claim 7, the instructions including further instructions to train the dual vector quantized variational autoencoder using cycle consistency, wherein the dual vector quantized variational autoencoder includes a shared latent space.

10. The computer of claim 1, the instructions including further instructions to train the vector quantized variational autoencoder using a discriminator.

11. The computer of claim 10, wherein the discriminator determines a real image from a fake image.

12. A method, comprising:
    inputting a fisheye image to a vector quantized variational autoencoder;
    encoding the fisheye image to first latent variables using an encoder;
    quantizing the first latent variables to generate second latent variables based on an embedded dictionary;
    decoding the second latent variables to a rectified rectilinear image using a decoder; and
    outputting the rectified rectilinear image.

13. The method of claim 12, further comprising operating a vehicle based on the rectified rectilinear image output from the vector quantized variational autoencoder.

14. The method of claim 13, further comprising operating the vehicle by controlling vehicle powertrain, vehicle brakes and vehicle steering.

15. The method of claim 12, wherein the vector quantized variational autoencoder is trained to transform the fisheye image to the rectified rectilinear image in a supervised mode using a training dataset that includes paired fisheye images and rectilinear images.

16. The method of claim 15, further comprising generating the paired fisheye images and rectilinear images using an analytical model based on a distortion model for a camera that acquired the fisheye images.

17. The method of claim 15, further comprising generating the paired fisheye images and rectilinear images using a fisheye camera and a rectilinear camera.

18. The method of claim 12, wherein the fisheye image is input to a dual vector quantized variational autoencoder which outputs the rectified rectilinear image.

19. The method of claim 18, further comprising training the dual vector quantized variational autoencoder in unsupervised mode using unpaired fisheye images and rectilinear images.

20. The method of claim 18, further comprising training the dual vector quantized variational autoencoder using cycle consistency, wherein the dual vector quantized variational autoencoder includes a shared latent space.

* * * * *